Oct. 11, 1966

C. R. DEMING 3,278,843

THICKNESS RATE MONITORING SYSTEM
FOR DEPOSITING DIELECTRIC FILMS

Filed Oct. 1, 1962

SIGNAL ON LEAD 88

SIGNAL ON LEAD 67

INVENTOR
CHARLES R. DEMING,
BY
Walter J. Adam
ATTORNEY.

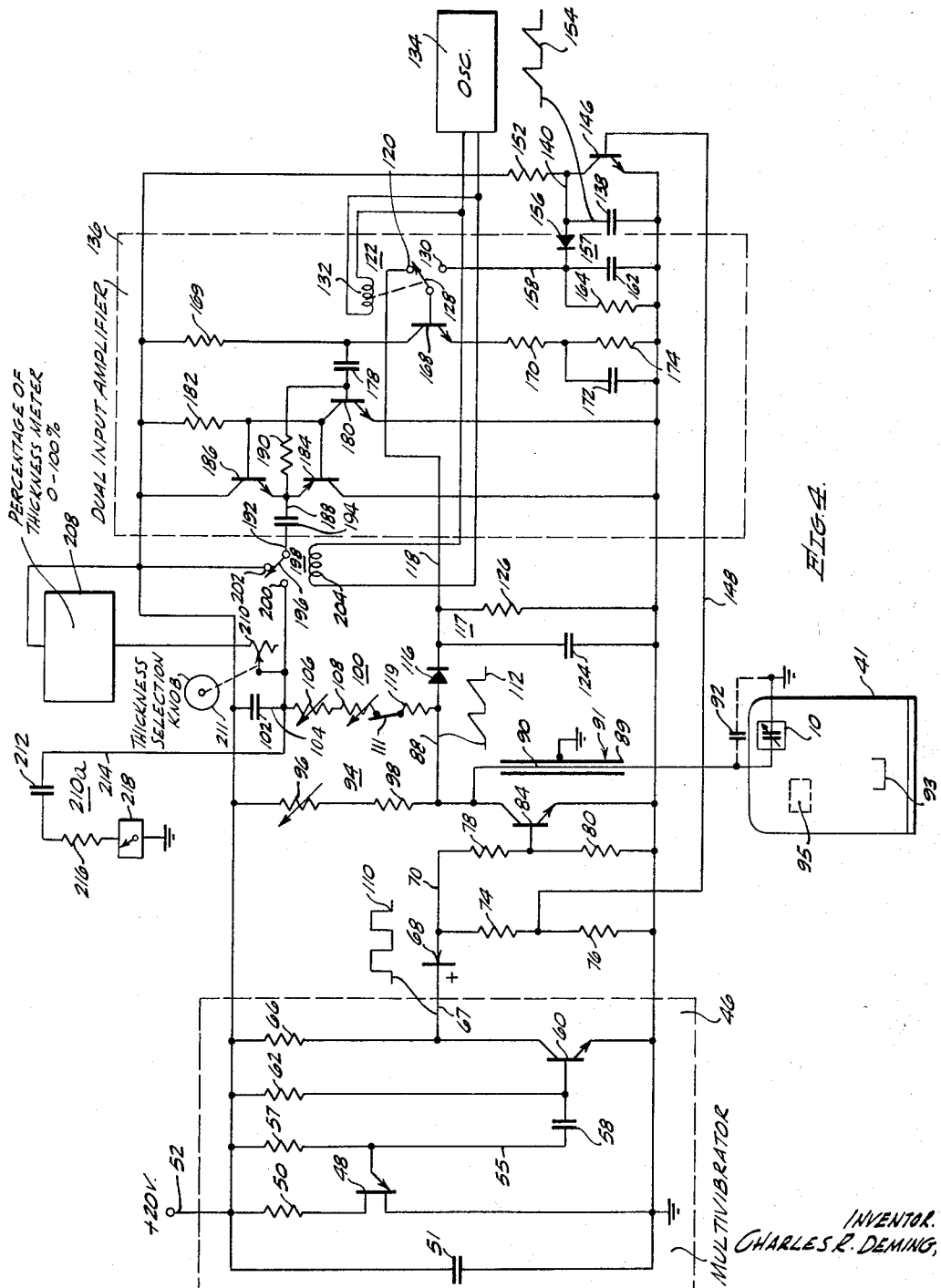

United States Patent Office 3,278,843
Patented Oct. 11, 1966

3,278,843
THICKNESS RATE MONITORING SYSTEM FOR DEPOSITING DIELECTRIC FILMS
Charles R. Deming, Los Angeles, Calif., assignor to Hughes Aircraft Company, Culver City, Calif., a corporation of Delaware
Filed Oct. 1, 1962, Ser. No. 227,230
3 Claims. (Cl. 324—61)

This invention relates to a system for monitoring the deposition of films and particularly to a system for monitoring the thickness and rate of deposition of thin and relatively thick films of dielectric material.

One of the major problems in the fabrication of thin film microelectronic circuitry and electronic elements is that of process controls. In particular it is essential to precisely control the thickness of the dielectric films being evaporated and the rate of evaporation. The electrical characteristics of thin film microcomponents such as capacitors and resistors are directly dependent upon the thickness of the film. The composition and crystalline structure of the evaporated film is affected by the evaporation rate. Film texture, stresses and optical properties are also influenced by the thickness of the evaporated film and the evaporation rate. Some conventional methods of determining film thickness during deposition are the weighing of the film in the deposition chamber and the determination of the optical transmittance or optical reflectance of the dielectric film. However, these conventional arrangements have the disadvantages of being limited in accuracy and of being unable to provide continuous and direct monitoring of the values of thickness and rate of change of thickness.

Accordingly, it is an object of this invention to provide an improved system for monitoring the deposition of material on a surface.

It is another object of this invention to provide a monitor for determining the thickness of a deposited film and the rate of deposition by direct readings and with a high degree of accuracy.

It is a further object of this invention to provide a thickness rate monitor for evaporated dielectric films that measures the percentage change of capacitance per unit of time of a capacitor and converts this change directly to rate.

It is a still further object of this invention to provide a system for monitoring the deposition of dielectric films that measure the percentage change of capacitance resulting from change of dielectric constant of a planar capacitor sensing element in the deposition chamber by comparison with a reference capacitor and that includes an improved arrangement to cancel the effect of capacitance in the leads between the comparison circuit and the planar capacitor.

Briefly, in accordance with this invention, the thickness and rate of deposition of a film of nonconductive or dielectric material is sensed by a sensor capacitor positioned in a deposition chamber. The sensor capacitor includes strips of conducting material adjacent to a substrate to form a capacitor on which the dielectric material is deposited to change the dielectric constant and the capacitance value of the capacitor. A first current path is provided to supply charging current to the sensor, which is periodically discharged, to charge the distributed capacitance of the lead between the sensor and the monitoring circuit. A second current path provides an increasing charging current in response to the increasing capacitance of the sensor to maintain a fixed peak voltage at the first end of the second current path coupled to the sensor. The voltage across the second current path is controlled by a servo or feedback arrangement to maintain the fixed peak voltage established for the varying sensor capacitor. Thus, the current in the first path is maintained at the constant average value. The change in voltage at the second end of the second current path represents percentage of capacitance change of the sensor which is related to deposited thickness in a substantially linear manner. Because the system utilizes percentage change of capacitance the monitoring is substantially independent of the initial value of capacitance of the sensor. The percentage of capacitance change is differentiated to indicate rate of deposition thickness.

The novel features of this invention, as well as the invention itself, both as to its organization and method of operation, will best be understood from the accompanying description, taken in connection with the accompanying drawings in which like reference numerals refer to like parts, and in which:

FIG. 4 is a schematic circuit diagram of the thickness monitoring system in accordance with this invention.

Figure 1:
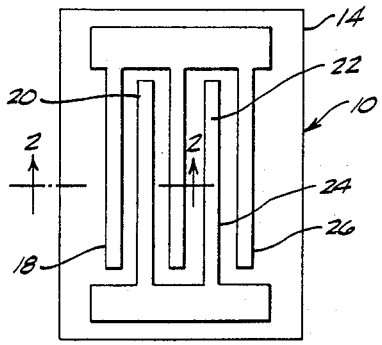
FIG. 1 is a plan view of a planar capacitance sensor array utilized in the system in accordance with this invention.
Figure 2:
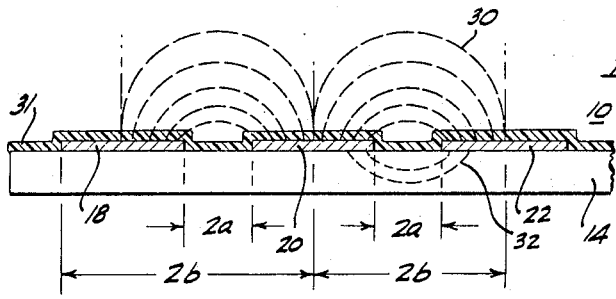
FIG. 2 is a sectional view taken at lines 2—2 of FIG. 1 for explaining the change of the dielectric constant in accordance with this invention.

Referring first to FIG. 1 and to the section of FIG. 2, the sensing element in accordance with this invention may be a planar capacitor 10 which is placed inside the deposition container or vacuum jar 41 (FIG. 4) for responding to deposition of a dielectric material such as silicon monoxide thereon. The capacitor 10 may include a substrate 14 of quartz material, for example. Also within the principles of this invention the substrate 14 may be glass or other suitable dielectric material preferably having a relatively low dielectric constant. Another requirement of the substrate 14 for some applications may be that the dielectric constant thereof be highly stable at elevated temperatures such as well above 200 degrees centigrade. Quartz has been found to have an extremely stable dielectric constant at higher temperatures. The conductors 18, 20, 22, 24 and 26 may be evaporated aluminum films etched to the appropriate comb pattern by means of conventional resist-etching techniques. As may be seen in FIG. 2 the dielectric flux field passes between the conductive strips such as 20 and 22 as shown by lines 30 and 32 respectively through the vacuum and through the substrate 14. The deposited dielectric material or film 31 during a monitoring operation increases the average dielectric constant of the capacitor 10.

The monitoring system in accordance with this invention measures the percentage change of capacitance of the capacitor 10 due to the deposited silicon monoxide film 31. To optimize the sensitivity of the sensor capacitor it is generally desirable to design the most capacitance value into the least deposition areas. The formula for capacitance between two identical infinite coplanar strips with near edge distance $2a$ and far edge distance $2b$ as shown in FIG. 2 may be expressed as:

$$C_1 = \epsilon K[(1-a^2/b^2)^{1/2}] \cdot [K(a/b)]^{-1} \qquad (1)$$

where $C_1$ = capacitance per meter in mks units
$K(k)$ = complete elliptical integral of modulus $k$ where $k_1 = (1-a^2/b^2)^{1/2}$ and $k_2 = a/b$ The function $K(k_1)$ and $K(k_2)$ may be solved by expansion of the elliptical integral of the form $$K = \int_0^{\frac{\pi}{2}} \frac{dx}{\sqrt{1-k^2 \sin^2 x}}$$

$\epsilon$=capacitivity or dielectric constant in mks units multiplied by $$\left(10 - \frac{9}{36}\pi\right)$$

It is assumed that $\epsilon = (\epsilon = vacuum + \epsilon substrate)/2$ for thin film coplanar strips deposited onto a substrate sensor.

Thus, it may be noted that the dielectric constant increases as dielectric material 31 is deposited on the conducting strips to increase the capacitance of the element 10 in accordance with the Equation (1). While Equation (1) is for the capacitance between two coplanar strips, the sensor 10 actually consists of a large number of coplanar strips. However, because the dielectric flux distribution is assumed to be confined between the center of one strip to the center of the next adjacent strip the active far edge distance is the center to center distance. This assumption is valid because each strip contributes capacitance to both its right and left hand neighbors. The correctness of this equation has been demonstrated by compared calculated and measured values for a sensor similar to the sensor 10.

In order to optimize the sensitivity of the sensor 10 the combined pattern should be designed so that it will have a relatively large capacitance. This design may be performed by utilizing the above Equation (1) and developing planar capacitors with a large number of planar strips. Also as discussed above the substrate material 14 is chosen to have a relatively low dielectric constant and a high degree of temperature stability so that the dielectric properties do not vary appreciably during the deposition operation. The increasing capacitance is thus substantially due to the deposition of the dielectric material. It is to be noted that sensor elements other than the type shown in FIG. 1 may be utilized in accordance with this invention. For example, a spiral configuration may be utilized for the conductor strips.

Figure 3:
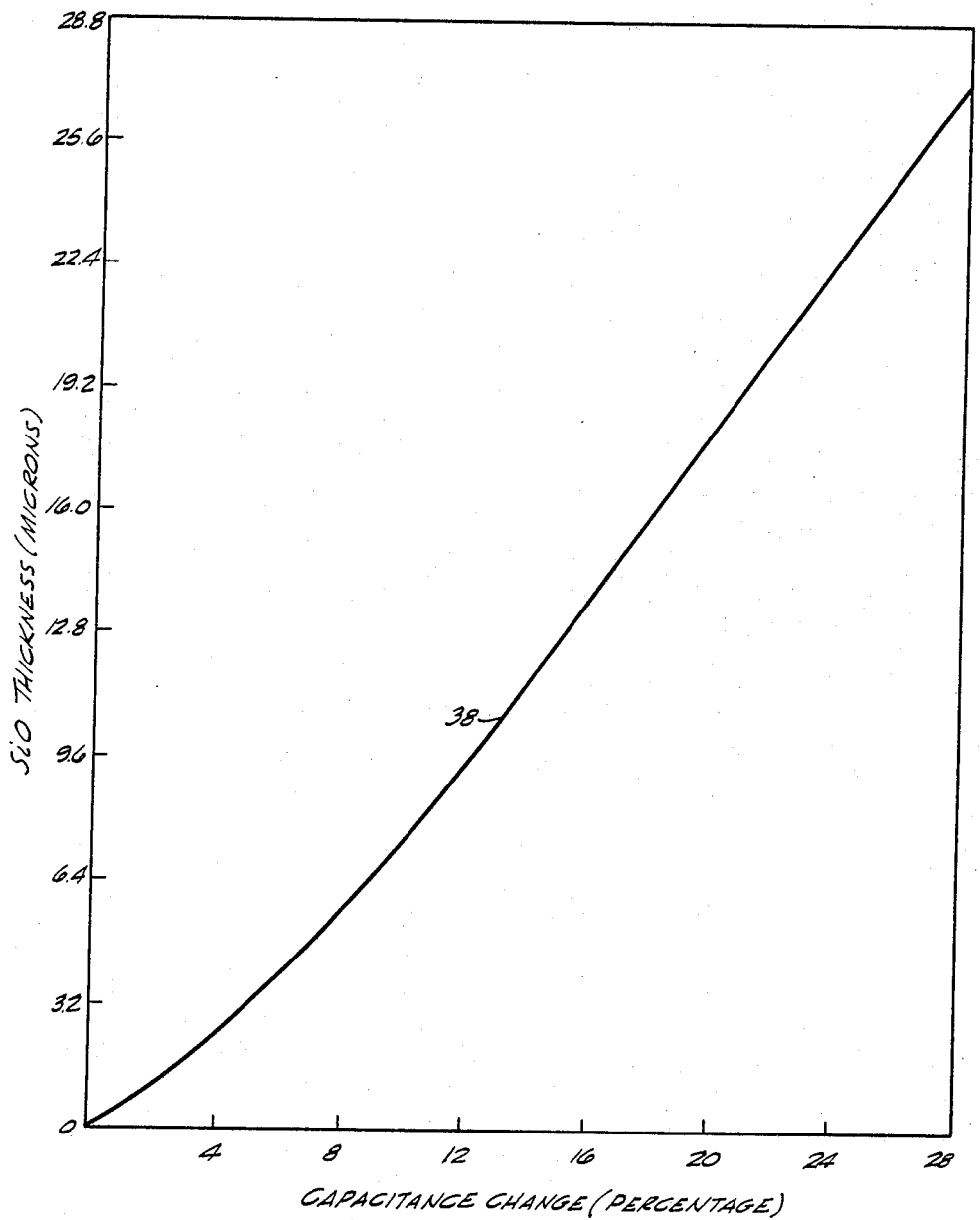
FIG. 3 is a graph of percentage of capacitance change versus thickness in microns of the sensor capacitor such as shown in FIG. 1 utilized in the system in accordance with this invention during deposition of silicon monoxide.

Referring now to the graph of FIG. 3, a relationship between the percentage change in initial capacitance versus the thickness of the evaporated silicon monoxide film in microns shown by a curve 38, is substantially linear. It is to be noted that the slight nonlinearity results from the nonlinear relation between dielectric constant and thickness. This curve 38 was determined by many evaporations of silicon monoxide on the sensor 10. After each evaporation was completed the bell jar 41 of FIG. 4 was opened, the sensor 10 removed and the capacitance thereof measured. Thickness measurements were then made by fringe counting techniques. Evaporation rates when determining the curve 38 ranged from .5 to 5 microns per minute. The curve 38 was plotted as an average value from data obtained from 45 silicon monoxide evaporations and a very small variation from linearity was present. It is to be noted that since the curve 38 is percentage of capacitance change the relation to film thickness is independent of the initial capacitance of the planar capacitor slide 10.

The curve 38 represents the calibration for a selected planar capacitor configuration with silicon monoxide being deposited thereon. However the curve 38 may be utilized for planar capacitors having other overall dimensions because the percentage of capacitance change remains the same for a corresponding change of thickness. It is to be noted that if nonconductive dielectric materials other than silicon monoxide are being monitored then separate calibration curves similar to 38 must be provided.

Referring now to FIG. 4, the monitor circuits in accordance with this invention includes multivibrator 46 having a unijunction transistor 48 with a first base terminal coupled through a resistor 50 to a suitable source of potential such as a plus 20 volt terminal 52. A second base terminal of the transistor 48 is coupled to ground and the emitter terminal of the transistor 48 is coupled to the plus 20 volt terminal 52 through a resistor 57 as well as through a capacitor 58 to the base of an npn type transistor 60. A bypass capacitor 51 is provided between the terminal 52 and ground. The base of the transistor 60 is also coupled through a resistor 62 to the plus 20 volt terminal 52, the emitter is coupled to ground and the collector is coupled through a resistor 66 to the terminal 52. The collector of the transistor 60 is further coupled through the cathode to anode path of a zener diode 68 to a lead 70 which in turn is coupled to ground through resistors 74 and 76 in one path and to ground through resistors 78 and 80 in another path. The zener diode 68 is selected to provide a desired voltage drop such as 8 volts. A switching transistor 84 of the npn type is included as a discharge switch and has a base coupled between the resistor 78 and 80, has an emitter coupled to ground and has a collector coupled to a lead 88. The lead 88 is coupled through a lead 90, which may be the conductor of a coaxial cable 91 to the sensor capacitor 10 which in turn is grounded at the other end and included in the vacuum jar 41. The shield 89 of the cable 91 may be coupled to ground. It is to be noted at the time that the lead 90 has a distributed capacitance indicated by a dotted capacitor 92 which is substantially constant during any deposition monitoring operation because of the fixed capacitance of the coaxial cable. However, the distributed capacitance 92 varies with length of cable 91 and configuration so that it may not be considered a constant value for the monitoring system. It is to be noted that the coaxial cable arrangement may be required in accordance with this invention to prevent continuous changes of the distributed capacitance indicated by 92 during a monitoring operation. Also other conducting arrangements having a substantially constant distributed capacitance may be utilized for the conductor 90 in accordance with this invention. As discussed above the sensor capacitor 10 has a changing capacitance as dielectric material is deposited thereon.

The vacuum container or jar 41 includes a source of material to be deposited such as a container 93 which may be electrically controlled from outside the jar. A product or object on which a film is deposited and which is monitored in accordance with this invention is shown by a rectangle 95. It is to be noted that the sensor capacitor 10 is positioned substantially horizontally in the vacuum container 41 with the side having the plates such as 18 and 20 thereat downward to receive or intercept evaporated material from the source 93.

For eliminating the effect of the distributed lead capacitance 92, a first adjustable current path 94 is provided including a first variable resistor 96 and a second resistor 98 coupled in series between the plus 20 volt terminal 52 and the lead 88. For responding to the capacitance change of the sensor 10, a second current path 100 is provided including a storage capacitor 102 having first end coupled to the plus 20 volt terminal 52 and a second end coupled to a lead 104. The second end of the capacitor 102 is also coupled through serially connected variable resistors 106 and 108, a switch 111 and a resistor 119 to the lead 88. The variable resistors 106 and 108 may respectfully provide a coarse and a fine adjustment for initially setting the voltage at the lead 104 to zero as indicated by a percentage of thickness meter 208. It is to be noted at that time that in response to the pulse of a waveform 110 developed by the multivibrator 46, the switching transistor 84 is alternately biased into and out of conductance to discharge and charge the sensor capacitor 10 and the fixed capacitor 92 to develop a signal of a waveform 112 on the lead 88.

The lead 88 is coupled to the anode of a diode 116 of a peak detector arrangement 117, the cathode being coupled to a lead 118 which in turn is coupled to a terminal 120 of a switch or chopper switch 122. The lead 118 is also coupled to ground through a parallel arranged storage capacitor 124 and relatively large leakage resistor 126 of the detector arrangement 117. The chopper switch 122 has an arm 128 which alternately contacts the terminal 120 and a terminal 130 in response to energization of a coil 132 which may be either magnetically or mechanically coupled to the arm 128. A source of A.C. (alternating current) signals may be provided by oscillator 134 which may operate at a 60 cycle rate for example. The arm 128 alternately applies these dual voltages at terminals 120 and 130 to the input of an amplifier 136.

A reference capacitor 138 is provided with a first end coupled to ground and second end coupled to a lead 140. A second discharge switch includes an npn type transistor 146 having a base coupled through a lead 148 to a point between the resistor 74 and 76 for responding to the signal of the waveform 110, having an emitter coupled to ground and a collector coupled through a resistor 152 to the plus 20 volt terminal 52. The collector of the transistor 146 is also coupled to the lead 140 for alternately charging and discharging the reference capacitor 138 as indicated by a waveform 154. The lead 140 is coupled to the anode of a diode 156 of a peak detector arrangement 157 and the cathode is coupled to a lead 158 which in turn is coupled to the terminal 130. The lead 158 is also coupled to ground through a parallel arranged storage capacitor 162 and relatively large leakage resistor 164 of the peak detector arrangement 157.

The dual input amplifier 136 includes an npn type transistor 168 having a base coupled to the arm 128, having an emitter coupled through a resistor 170 and in turn through a parallel arranged capacitor 172 and resistor 174 to ground and having a collector coupled through a coupling capacitor 178 to the base of an npn type transistor 180. The collector of the transistor 168 is also coupled to the terminal 52 through a resistor 169. The emitter of the transistor 180 is coupled to ground and the collector is coupled through a resistor 182 to the plus 20 volt terminal 52. The collector of the transistor 180 is also coupled to the bases of a pnp type transistor 184 and an npn type transistor 186. The collector of the transistor 186 is coupled to the plus 20 volt terminal 52, the collector of the transistor 184 is coupled to ground and the emitters of the transistors 184 and 186 are coupled to a lead 188 which in turn is coupled through a biasing resistor 190 to the base of the transistor 180. The lead 188 is coupled to a lead 192 through a capacitor 194 for applying D.C. (direct current) signals to an arm 196 of a chopper switch 198. The chopper switch 198 includes first and second terminals 200 and 202 for alternately being contacted by the arm 196 and being controlled by a coil 204 through a magnetic or mechanical connection. The coil 204 may be controlled by A.C. signals from the oscillator 134. The amplifier 136 operates in a conventional manner with the transistors 168 and 180 providing two stages of amplification and the transistors 184 and 186 operating as a bidirectional emitter follower stage.

The terminal 202 is coupled to the plus 20 volt terminal 52 and the terminal 200 is coupled to the lead 104 for applying a negative feedback voltage thereto to maintain a desired peak voltage on the lead 88 while at the same time correcting the peak voltage on the lead 88 to correspond to the reference voltage. Thus, the voltage maintained across the capacitor 102 provides a direct indication of the capacitance of the sensor element 10.

To sense the voltage on the lead 104 the percentage of thickness meter 208 which includes a scale showing the percentage of thickness change between 0 and 100 percent is coupled to the plus 20 volt terminal 52 and is coupled through a variable multiplier resistor 210 to the lead 104. The variable resistor 210 which may be a potentiometer arrangement is controlled by a manual thickness selection adjustment knob 211. The adjustment knob 211 may have a scale in microns between 3 and 30 microns, for example. Because of the fixed resistance of the meter 208, the scale of the adjustment knob 211 may have a nonlinear portion. Because of the relation shown in FIG. 3 between the percentage of the capacitance change and film thickness, the percentage meter 208 also represents the percentage of change of capacitance as determined by the setting of the multiplier resistor 210. The meter 208 which responds to current always changes the reading the full 100% scale for a fixed current therethrough.

Because the percentage of capacitance change on the lead 104 may be differentiated to provide the rate of deposition of the dielectric material such as silicon monoxide, a differentiation circuit 210a includes a capacitor 212 coupled at one end through a lead 214 to the lead 104 and coupled at the other end through a resistor 216 to a rate meter 218 having a dial calibrated for rate, between 0 and 3 microns per minute, for example. The other end of the rate meter 218 may be coupled to ground.

Figure 5:
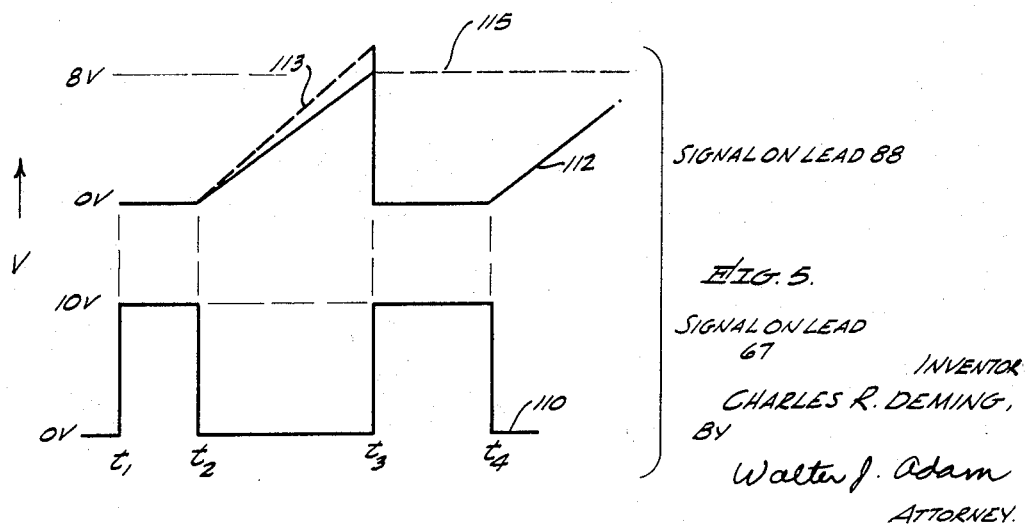
FIG. 5 is a schematic diagram of waveforms for further explaining the monitoring system of FIG. 4.

Referring now to the waveforms of FIG. 5, as well as to FIG. 4, the operation of the monitor circuit will be explained in further detail. The multivibrator 46 operates to charge the capacitor 58 when the unijunction transistor 48 is biased out of conduction. During this period the positive potential is applied from the terminal 52 through the resistor 57 and the capacitor 58 to maintain the transistor 60 biased in conduction. Approximately zero volts of the waveform 110 is applied to the lead 67. When the capacitor 58 charges sufficiently so that a sufficient positive potential is applied to the lead 55 the unijunction transistor 48 fires or passes through the negative resistance region to a high current low voltage drop point. Approximately ground potential is then applied to the lead 55 to bias the transistor 60 out of conduction. The capacitor 58 then starts to discharge through the emitter of the transistor 48. When the transistor 60 is biased out of conduction because of the lowering of potential on the lead 55, approximately 10 volts of the waveform 110 is applied to the lead 67 at time $t_1$. After the capacitor 58 discharges through the emitter of the transistor 48 to lower the voltage on the lead 55 to below the valley voltage, that transistor is restored to the nonconductive or low current state and the transistor 60 is again biased into conduction.

Thus, at time $t_2$ approximately ground potential is applied to the lead 67. The capacitor 58 again starts to charge through the resistor 57 to increase the voltage at the emitter of the unijunction transistor 48 and the operation continues in a similar manner at times $t_3$ and $t_4$. The unijunction transistor 48 is well known in the art and may be a silicon type 2N491.

The zener diode 68 which may be selected to provide 8 volts of drop applies the signal of the waveform 110 to the base of the transistor 84 as well as through the lead 148 to the base of the transistor 146 to alternately switch both transistors on or both transistors off at a relatively high rate. For example, the period between times $t_1$ and $t_2$ may be 4 microseconds and between times $t_2$ and $t_3$ may be 6 microseconds. This switching action allows the capacitor of the sensor 10 and fixed capacitor 92 as well as the reference capacitor 138 to alternately charge and discharge. The current required to charge the sensor capacitor 10 to a reference peak voltage on the lead 88 in the period between times $t_2$ and $t_3$ is then utilized to determine the percentage of change of capacitance of the sensor 10.

When initially starting a monitoring operation the current required to charge the fixed stray capacitance indicated by the dotted capacitor 92 is first adjusted with the sensor 10 disconnected from the coaxial cable 90 and the coaxial adjust switch 111 open. The variable resistor 106 of the current path 100 is accordingly adjusted with the discharge and charging operation being performed. Because of the operation of the dual amplifier 136, which will be explained subsequently, the indicating needle of the meter 208 changes from one end of the dial to the other when a selected 8 volts peak is reached on the lead 88. This indication is provided because the amplified selected reference voltage on the lead 158 which may be 8 volts is alternately applied to the capacitor 194 and because of the disconnected path 100, a change of the voltage on the lead 118 to an opposite polarity from the voltage on the lead 158 causes a rapid change of voltage on the lead 104.

After this adjustment is completed, the sensor 10 is connected to the coaxial cable 90 and the coaxial adjust switch 111 is closed. The operation of the negative feedback of the amplifier 136 maintains the selected peak voltage of approximately +8 volts of the waveform 112 on the lead 88 by servicing the voltage on lead 104. In order to set the meter 208 to zero, the resistance of the variable resistors 106 and 108 are then adjusted so that +20 volts is established on the lead 104 which is zero volts across the capacitor 102. The negative feedback operation of the amplifier 136 maintains the required current through the path 100 so the waveform 112 is continually charged to +8 volts at the peak during the time period such as between times $t_2$ and $t_3$.

The next step is to set the thickness knob 211 to a selected thickness with the meter 208 changing from 0 to 100% full scale for the selected thickness. For example for a selected thickness the voltage on the lead 104 will rise a predetermined number of volts and the scale on the knob 211 is such that the multiplier resistor 210 will have a value so that the percentage of thickness meter 208 will change its reading from 0 to 100% for this voltage rise on the lead 104. For a larger required voltage rise on the lead 104, the resistor 210 is set at a larger value. The deposition operation in the vacuum container 41 is then performed and monitored by activating the source of material 93.

To further consider the negative feedback operation, shortly after time $t_2$, the stray capacitor 92 and the sensor capacitor 10 discharge through the transistor 84 and the reference capacitor 138 discharges through the transistor 146. Thus, the voltage on the lead 88 is substantially zero volts as shown by the waveforms 112 and 154. At time $t_2$ in response to the fall of potential of the waveform 110, the transistors 84 and 146 are biased out of conduction and the sensor capacitor 10 and the fixed capacitor 92 start to charge through the current paths 94 and 100. At the same time the reference capacitor 138 starts to charge by current flowing through the resistor 152. Until time $t_3$, the sensor capacitor 10 and the fixed capacitor 92 are charged by electrons flowing therefrom to the lead 90. At time $t_3$, the capacitors 92 and 10 discharge rapidly to ground potential as well as the reference capacitor 138. The peak voltage of the waveform 112 is set at 8 volts by the servo action and by the selected values of the resistor 152 and the capacitor 138. The positive peak value of the waveform 112 is selected by the peak detector 117. This voltage indicated by the line 115 is compared with the voltage on the lead 158 which is also the peak voltage of the waveform 154, which latter voltage is the reference voltage. As is well known, a peak detector, such as 117 functions by charging up the storage capacitor 124 through the diode 116 to the peak of the input signal of the waveform 112. The D.C. voltages maintained on the leads 88 and 158 are determined by the fixed time interval of charging between times $t_2$ and $t_3$ and by the value of the resistor 152 and the reference capacitor 138, the feedback operation of the amplifier 136 maintaining the reference voltage peak on the lead 88.

In response to the operation of the chopper switch 122 which for example may operate at a 60 cycle rate, the D.C. signals on the leads 118 and on the leads 158 are alternately applied to the amplifier 136. The amplifier 136 is an A.C. amplifier that responds to a square wave input signal determined by the chopper switch 122 and having an A.C. output signal on the lead 192 that is demodulated to a D.C. signal by the chopper switch 198. When the arm 128 contacts the terminal 120 the D.C. voltage on the lead 118 is applied through the amplifier to the lead 188 and the capacitor 194 with the arm 196 contacting the terminal 202. Thus, the plate of the capacitor 194 coupled to the lead 188 charges or discharges through the emitters of the transistors 184 and 186 to a value determined by the amplified D.C. signal on the lead 118 with +20 volts applied to the lead 192.

In response to the oscillator 134, the arm 128 then contacts the terminal 130 and the arm 196 contacts the terminal 200. Thus, the D.C. reference voltage on the lead 158 is applied through the amplifier 136 to the lead 188 and the charge on the plate of the capacitor 194 at the lead 188 is changed to correspond to the D.C. reference voltage and the positive charge on the capacitor 102 above the +20 volts of the terminal 52 is changed to vary the current through the path 100. Thus, electrons are effectively transferred from the +20 volt terminal 52 to the capacitor 194 and to the capacitor 102 to maintain a desired voltage on the lead 104. The voltage on the lead 104 is thereby changed to maintain lead 88 at a peak voltage similar to the voltage on the lead 140. This constant peak voltage maintains a substantially constant average current through the current path 94. The voltage on the lead 104 thus rises to supply the increased current to the sensor capacitor 10 as the capacitance increases while the film deposition operation is being performed.

For example, when the voltage of the waveform 112 increases to that shown by a dotted waveform 113, the D.C. voltage on the lead 118 increases slightly. When the arm 128 contacts the terminal 120, this increased voltage is amplified and applied to the lead 188 as the higher part of the square wave output. Because the arm 202 contacts the +20 volt terminal 52, the charge on the plate of the capacitor coupled to the lead 188 decreases as electrons flow therefrom. Thus, when the arm 196 moves to contact the terminal 200, with the reference voltage of 8 volts for example, on the lead 158, a lower voltage is applied to the lead 188. Electrons then flow from the capacitor 194 to the capacitor 102 to lower the voltage on the lead 104 and correct the peak voltage on the lead 88 to the +8 volts, for example. This inverse feedback or servo operation is continuous with a constant reference to the peak voltage of the reference capacitor 138 to maintain a constant voltage on the lead 88. It is to be noted that by utilizing a similarly derived reference voltage the effect of temperature variations are minimized.

Because the peak voltage on the lead 88 remains constant as the current changes through each cycle of the waveform 110, the voltage on the lead 104 is linearly related to the percentage of change of capacitance of the sensor 10. This voltage is sensed by the percentage change of thickness meter 208 to provide a direct reading of thickness as selected by the multiplier resistor 210. The scale of the thickness knob 211 may be calibrated to overcome the slight nonlinearity of the curve 38. It is to be noted that the voltage on the lead 104 is linear with the percentage of capacitance change of the sensor 10, but the nonlinearity of the curve 38 is caused by variations in density of the deposited dielectric material. The voltage at the lead 104 representing percentage of capacitance change is also differentiated by the differentiator 210 to provide a direct reading at the rate meter 218. In deposition of films, rate as well as thickness may be monitored.

The evaporation rate dial of the meter 218 may be calibrated by accurately timing several silicon monoxide evaporations and obtaining the rate as a function of position on the dial face.

To further explain the operation of the system in accordance with this invention to utilize percentage of capacitance change so that the thickness monitoring is independent of the initial value of capacitance, a given percentage of change of capacitance of the sensor 10 from an initial capacitance value is required for a selected thickness to be deposited on the sensor capacitor 10. A selected percentage change of capacitance on any sensor slide provides a thickness as shown by the curve 38 of FIG. 3. The curve 38 was determined on the basis of percentage change of initial capacitance of a plurality of planar capacitor slides. The percentage of change of capacitance equals the same percentage change of current in the path 100 which is equal to the same percentage change in voltage across the path 100, that is, the change in voltage at the lead 104 because the peak voltage at lead 88 is maintained constant by the feedback operation.

With 20 volts always initially set at the lead 104 by adjusting the resistors 106 and 108, while the required current is maintained through the path 100 to the sensor capacitor 10 by the feedback operation, a desired percentage change in voltage at the lead 104 results in a certain voltage rise above +20 volts. This voltage rise at the lead 104 is utilized to determine the scale of the thickness knob 211 which controls the value of the multiplier resistor 210. The voltage rise above +20 volts on the lead 104 is directly related to thickness. This voltage rise is also directly related to a percentage change of capacitance which is also directly related to deposited thickness. Thus, the voltage on the lead 104 is independent of the initial capacitance of the sensor 10 because the adjustment of resistance of the path 100 and the feedback operation maintains the required current to charge the capacitor to +8 volts in the selected time period such as between times $t_2$ and $t_3$. For direct reading of the meter 208, the voltage on the lead 104 is initially adjusted to zero.

For example for one setting of the multiplier resistor 210, the initial capacitance of the sensor 10 at the start of a deposition operation may be 50, 100 or 200 micromicrofarads. For a desired selected thickness the percentage of change of capacitance may be 13 percent for a required 10 microns thickness which is the same for each of these initial capacitance values from the curve 38 of FIG. 3. The required change of capacitance may be respectively 5, 10 and 20 micromicrofarads for the same thickness. Thus, for a desired thickness of deposition, the percentage change is constant and independent of the original value of capacitance.

For a second selected thickness the knob 211 is set to another value and a constant percentage change of the initial capacitance indicates the second selected thickness independent of the initial value of capacitance of the sensor 10 at the start of a deposition operation.

The thickness monitor may be utilized for other non-conductive or dielectric materials by plotting curves of percentage of capacitance change as a function of dielectric film thickness and utilizing these curves to determine the voltage on the lead 104 and recalibrate the thickness meter. Because the system in accordance with this invention utilizes percentage of capacitance change, the values are independent of initial capacitance value of the sensor 10. Thus, each sensor may be utilized several times and may have a wide tolerance in overall dimensions and construction. The monitor system in accordance with this invention may be utilized in a vacuum desposition system or in any type of system that evaporates from a source.

Thus, there has been described a thickness monitor system that provides a direct reading of thickness by responding to a voltage representing percentage of capacitance change. A sensor capacitor may be utilized with a very low tolerance as to dimensions and initial capacitance characteristics. The monitor provides an arrangement to overcome the effect of the fixed capacitance of the cable or lead between the deposition chamber and the circuit. A reference circuit is utilized to cancel the effect of changes of temperature and other parameters. Continuous values of both thickness and rate of deposition may be read instantaneously and directly.

What is claimed is:

1. A system for monitoring the deposition of a dielectric material from a source comprising a sensor capacitor positioned adjacent to the source to receive said deposited material, a coaxial cable having first and second ends with said first end connected to said sensor capacitor, said cable having a distributed capacitance, a first source of reference potential, a first adjustable impedance path connected from said first source of reference potential to the second end of said cable, a second adjustable impedance path having first and second ends with said first end connected to the second end of said cable, a reference capacitor, a third impedance path connected from said first source of reference potential to said reference capacitor, a source of switching signals, a second source of reference potential, first switching means connected to said source of switching signals and between said coaxial cable and said second source of reference potential, second switching means connected to said source of switching signals and between said reference capacitor and said second source of reference potential, first and second peak detecting means connected to said second source of reference potential and respectively to said coaxial cable and to said reference capacitor, a first storage capacitor, dual input amplifier means including first chopper means connected to said first storage capacitor for alternately connecting said first storage capacitor to said first and second peak detecting means, said amplifier means including second chopper means connected to said first storage capacitor for alternately connecting said first storage capacitor to said first source of reference potential and to the second end of said second impedance path, a second storage capacitor connected to the second end of said second impedance path and to said first source of reference potential, and meter means connected from said first source of reference potential to said second storage capacitor for responding to the voltage thereat, the voltage at said storage capacitor representing the percentage change of capacitance of said sensor capacitor and the deposited thickness of said dielectric material.

2. A system for monitoring the deposition of a dielectric material from a source comprising a sensor capacitor positioned adjacent to the source to receive a portion of said material, connecting means having a first end connected to said sensor capacitor, said connecting means having a distributed capacitance, a first source of reference potential, first impedance means connected from said first source of reference potential to the second end of said connecting means to supply current to said sensor capacitor, second impedance means having first and second ends with said first end connected to the second end of said connecting means, a reference capacitor, third impedance means connected from said first source of reference potential to said reference capacitor, a source of periodic switching signals, a second source of reference potential connected to said sensor capacitor and to said reference capacitor, first switching means connected to said source of switching signals and between said connecting means and said second source of reference potential, second switching means connected to said source of switching signals and between said reference capacitor and said second source of reference potential, said first and second switching means periodically discharging said sensor capacitor, said distributed capacitance and said reference capacitor, first and second peak detecting means respectively connected to said connecting means and to said reference capacitor, a first storage capacitor connected from said source of reference potential to the second end of said second current path, a second storage capacitor, dual input amplifier means connected to said second storage capacitor and including chopper means for alternately connecting said second storage capacitor to said first and second peak detecting means and for alternately connecting said second storage capacitor to said first source of reference potential and to said first storage capacitor, said amplifier means providing an inverse feedback to maintain a signal at said connecting means as determined by said reference capacitor, and meter means connected from said first source of reference potential to said first storage capacitor for responding to the voltage thereat, the voltage at said first storage capacitor representing the percentage change of capacitance of said sensor capacitor and the deposited thickness of said dielectric material.

3. A system for monitoring the thickness of a deposited film comprising first and second sources of potential, a sensor capacitor positioned to receive the film and having first and second ends with the first end connected to said second source of potential, a source of pulses, a first impedance path connected between said first source of potential and the second end of said sensor capacitor, a storage capacitor having first and second ends with the first end connected to said first source of potential, a second impedance path connected between the second end of said storage capacitor and the second end of said sensor capacitor, a reference capacitor having first and second ends with the first end connected to said second source of potential, a third impedance path connected between said first source of potential and the second end of said reference capacitor, first switching means connected between said first and second impedance paths and said second source of potential, second switching means connected between said third impedance path and said second source of potential, a source of pulses, said first and second switching means connected to said source of pulses for simultaneously being switched into conduction and out of conduction to discharge said sensor capacitor and said reference capacitor, first and second peak detecting means connected to said second source of potential and respectively to said sensor capacitor and to said reference capacitor, amplifier means, first chopping means connected to said first storage capacitor between said amplifier means and said first and second peak detecting means for alternately responding to the detected signals thereat, capacitive means connected to said amplifier means, second chopping means connected from said capacitive means to the second end of said storage capacitor and said first source of potential for alternately connecting said capacitive means to said storage capacitor and to said first source of potential, and meter means connected between said first source of potential and said second end of said storage capacitor for responding to the voltage thereat representative of thickness of deposited material on said sensor capacitor.

References Cited by the Examiner
UNITED STATES PATENTS

| | | | |
|---|---|---|---|
| 2,852,739 | 9/1958 | Hansen | 324—61 |
| 3,119,267 | 1/1964 | Bartky | 324—61 |
| 3,135,916 | 6/1964 | Tannenbaum et al. | 324—60 |

WALTER L. CARLSON, *Primary Examiner.*

W. H. BUCKLER, *Assistant Examiner.*